(12) United States Patent
Zhan et al.

(10) Patent No.: US 7,189,150 B2
(45) Date of Patent: Mar. 13, 2007

(54) SYSTEM AND METHOD FOR EDGE BLENDING HARD DRIVE HEAD SLIDERS

(75) Inventors: Zhu Jian Zhan, Dongguan (CH); Ryuji Fujii, Kwai Fung Crescent (HK); Quan Bao Wang, Dongguan (CN); Niraj Mahadev, Kwai Fung Crescent (HK); Kazumasa Yasuda, Kwai Fung Crescent (HK)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 10/691,389

(22) Filed: Oct. 22, 2003

(65) Prior Publication Data

US 2004/0242131 A1 Dec. 2, 2004

(30) Foreign Application Priority Data

May 12, 2003 (CH) .................... PCT/CN03/00339

(51) Int. Cl.
*B24B 1/00* (2006.01)
(52) U.S. Cl. .................... 451/59; 451/168; 451/36
(58) Field of Classification Search ............... 451/59, 451/41, 36, 28, 168, 316, 314, 304, 310; 29/603.12, 60.17, 603.17
See application file for complete search history.

(56) References Cited

U.S. PATENT DOCUMENTS

| | | | |
|---|---|---|---|
| 5,335,458 A | 8/1994 | Stoffers et al. | |
| 5,468,177 A | 11/1995 | Kindler et al. | |
| 5,603,156 A | 2/1997 | Biskeborn et al. | |
| 5,632,669 A | 5/1997 | Azarian et al. | |
| 5,735,036 A | 4/1998 | Barr et al. | |
| 5,749,769 A | 5/1998 | Church et al. | |
| 5,885,131 A | 3/1999 | Azarian et al. | |
| 5,982,583 A | 11/1999 | Strom | |
| 6,040,034 A | 3/2000 | Okada et al. | |
| 6,040,959 A | 3/2000 | Kobayashi et al. | |
| 6,162,114 A * | 12/2000 | Kobayashi et al. | 451/41 |
| 6,255,621 B1 | 7/2001 | Lundquist et al. | |
| 6,257,959 B1 * | 7/2001 | Kobayashi et al. | 451/28 |
| 6,361,399 B2 * | 3/2002 | Kobayashi et al. | 451/5 |
| 6,398,623 B1 | 6/2002 | Fukuroi et al. | |
| 6,531,084 B1 | 3/2003 | Strom et al. | |
| 2001/0030835 A1 | 10/2001 | Hipwell et al. | |
| 2001/0043559 A1 | 11/2001 | Schaenzer et al. | |
| 2002/0039256 A1 | 4/2002 | Polycarpou et al. | |
| 2004/0087253 A1 | 5/2004 | Mahadev et al. | |

FOREIGN PATENT DOCUMENTS

| | | |
|---|---|---|
| CN | 1254922 A | 5/2000 |
| JP | 2301014 A2 | 12/1990 |
| JP | 5282641 A2 | 10/1993 |
| JP | 8203050 A2 | 8/1996 |
| JP | 9091648 A2 | 4/1997 |
| JP | 9290359 A2 | 11/1997 |

* cited by examiner

*Primary Examiner*—Dung Van Nguyen
(74) *Attorney, Agent, or Firm*—Kenyon & Kenyon LLP

(57) ABSTRACT

A system and method are disclosed for edge blending hard drive head sliders by oscillating abrasive lapping tape across the edges of multiple sliders simultaneously. Lapping tape is inserted between each of a number of head sliders bonded to a edge blending jig of an edge blending assembly. The edge blending assembly is adjusted to cause the lapping tape to partially wrap an edge of each slider. The head sliders are edge blended by the relative movement between the sliders and the lapping tape.

29 Claims, 10 Drawing Sheets

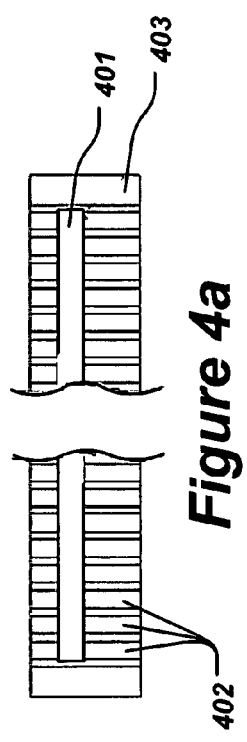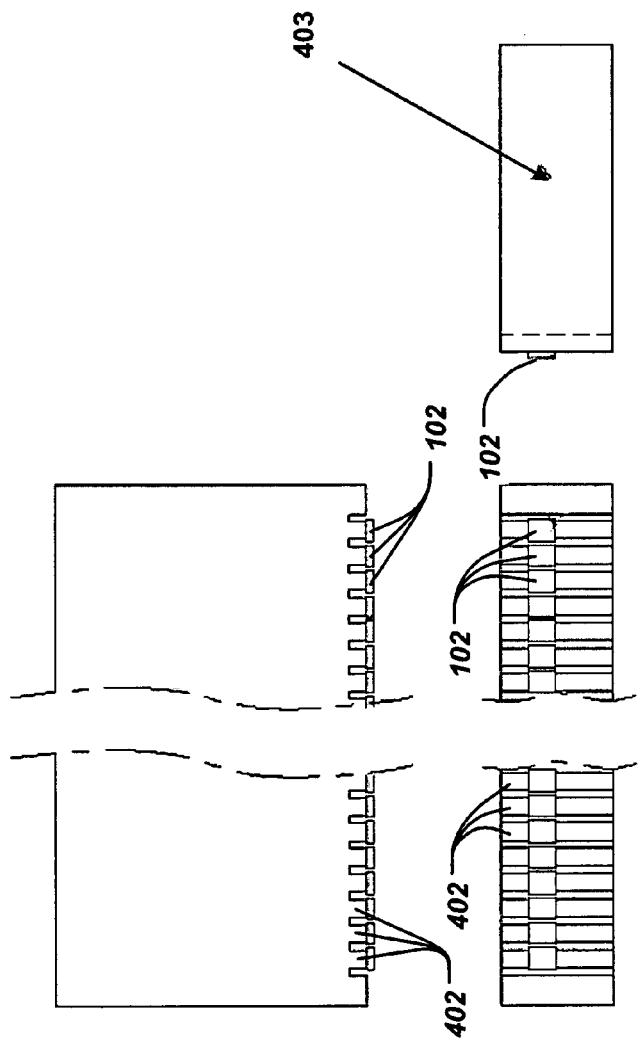
Figure 4a
Figure 4b

Top View

Front View

SYSTEM AND METHOD FOR EDGE BLENDING HARD DRIVE HEAD SLIDERS

BACKGROUND INFORMATION

The present invention relates to hard disk drives. More specifically, the invention relates to a system and method for edge blending hard drive head sliders.

FIG. 1 provides an illustration of a typical hard disk drive. Hard disk drive storage devices typically include a rotating disk 101 mounted for rotation by a spindle motor (not shown). A slider 102, supported by a suspension arm 103, 'flies' over the surface of the magnetic disk 101 at a high velocity, reading data from and writing data to concentric data tracks 104 on the disk 101. The slider 102 is positioned radially by a voice coil motor 105.

FIG. 2 shows a more detailed view of a head slider 102 flying over the surface of a magnetic disk 101 as is typical in the art. Modern head sliders 102 float over the surface of the disk 101 on a cushion of air. If the 'flying height' is too great, the head 201 on the head slider cannot properly read from and write to the disk 101. If it is too small, there is an increased chance of a head crash.

If a head slider 102 contacts the surface of the disk while it is at operational speed, the result can be a loss of data, damage to the head slider, damage to the surface of the disk 101, or all three. One of the most common causes of head crashes is a contaminant getting wedged in the microscopic gap between head 102 and disk 101. Head sliders 102 are typically ceramic for durability and corrosion resistance. A ceramic slider is durable due to its hardness. The tradeoff, however, of ceramic's hardness is its brittleness. When a row bar is cut into individual sliders 102 (explained below), the ceramic crystal array causes the slider 102 edges to crack easily. Loose chips of ceramic material may be found on the cutting surface edge corners even after solvent cleaning. Also, after cutting a row bar into individual sliders, a high point is often left on the cut slider surface. This is known as 'edge jump'. Edge jump is believed to be from the stress applied to the cut edge of the slider 102. A deformation layer 301 is created by the pressure created by the cutting process. (See FIG. 3).

FIG. 3 illustrates the problems related to particle contamination and edge jump as is typical in the art. The problems concerning loose chips 302 and edge jump 301 can cause hard drive head crashes. A loose chip 302 may fall from the slider and contaminate the interface between the slider 102 and disk 101. An edge jump 301 can affect a slider's anti-shock performance negatively. If the HDD gets a physical impact while operating, a location of edge jump may contact and damage the disk 101.

It is therefore desirable to have a system and method for edge blending hard drive head sliders that avoids the above-mentioned problems, as well as having additional benefits.

BRIEF DESCRIPTION OF THE DRAWING

FIG. 4 illustrates a head parting jig as is typical in the art.

DETAILED DESCRIPTION

FIG. 4 illustrates head parting jig as is typical in the art. As is illustrated in FIG. 4a, a slider row bar 401 is typically bonded to multiple arms 402 of a head parting jig 403. As is illustrated in FIG. 4b and described further below, the row bar is cut into individual head sliders 102 by a slider parting tool (not shown).

Figure 1:
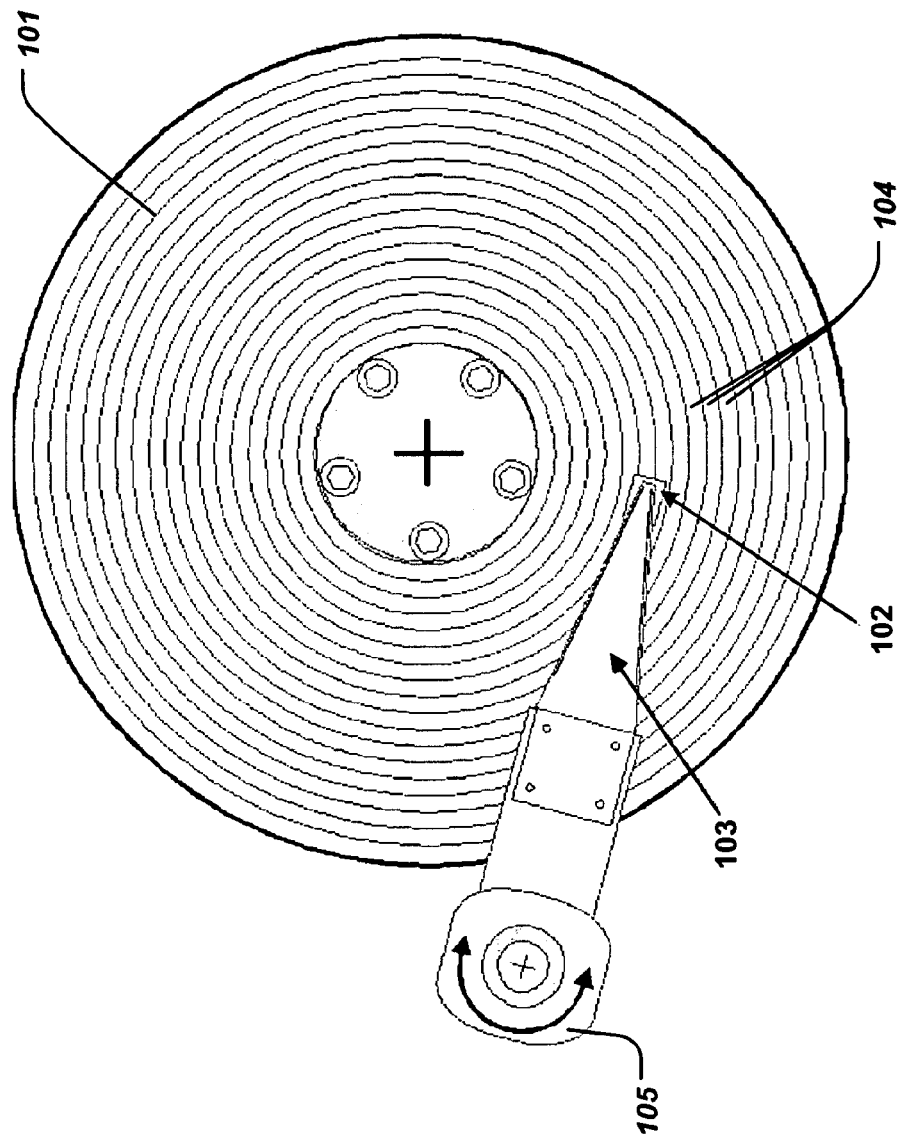
FIG. 1 provides an illustration of a typical hard-disk drive.
Figure 2:
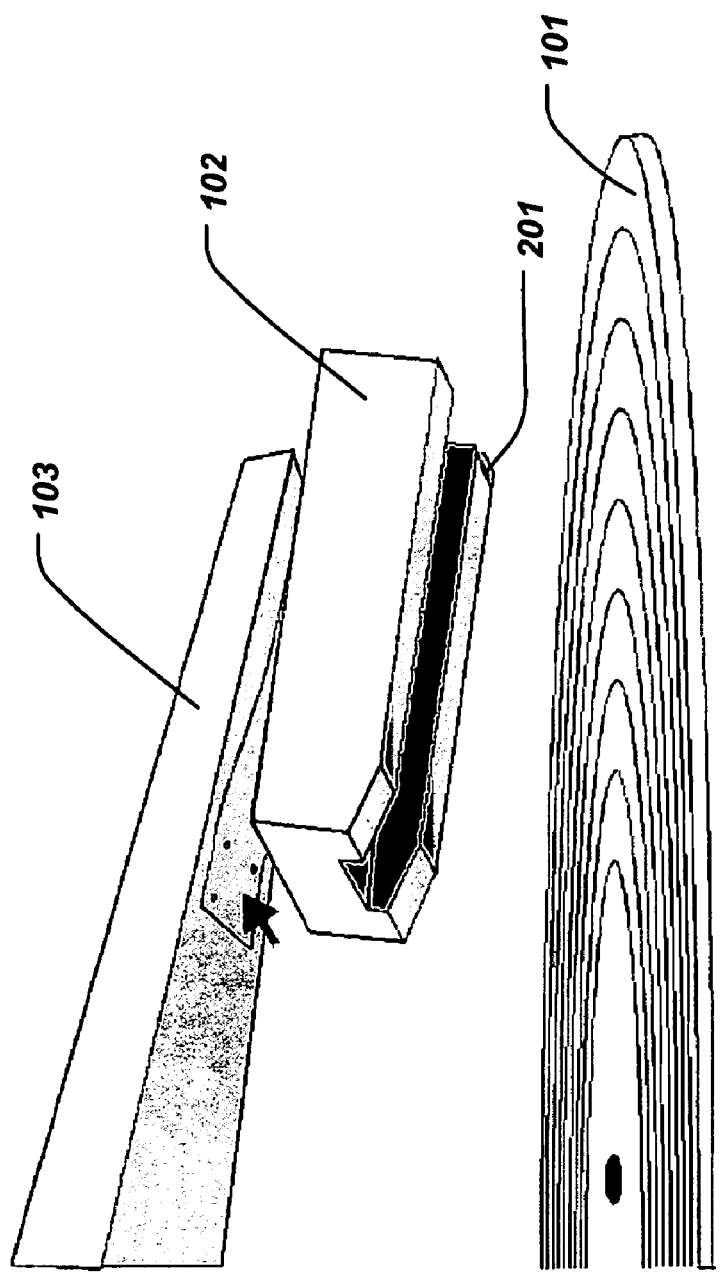
FIG. 2 shows a more detailed view of a head slider flying over the surface of a magnetic disk as is typical in the art.
Figure 3B:
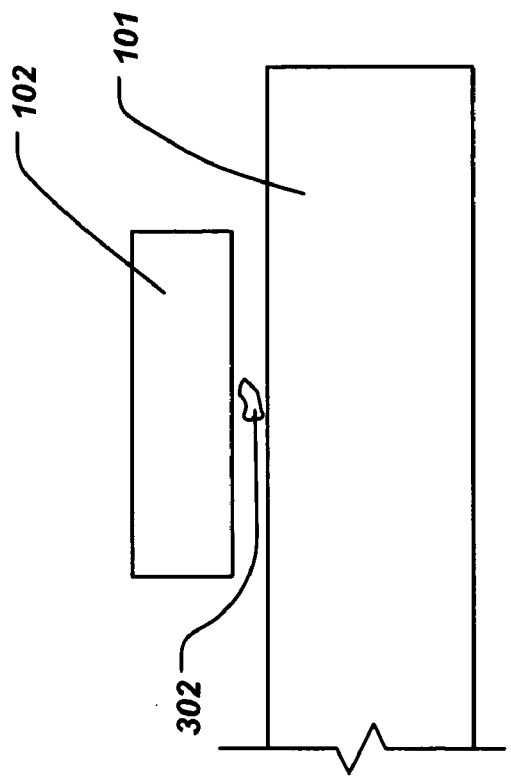
FIG. 3 illustrates the problems related to particle contamination and edge jump as is typical in the art.
Figure 3A:
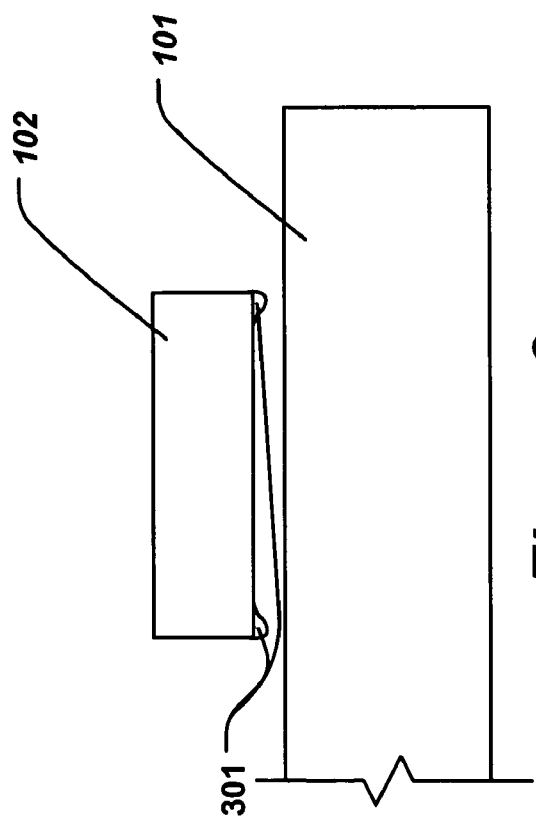
Figure 5A:
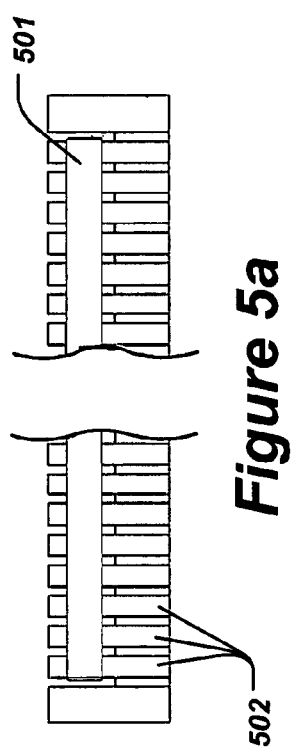
FIG. 5 illustrates an edge blending jig according to an embodiment of the present invention.
Figure 5B:
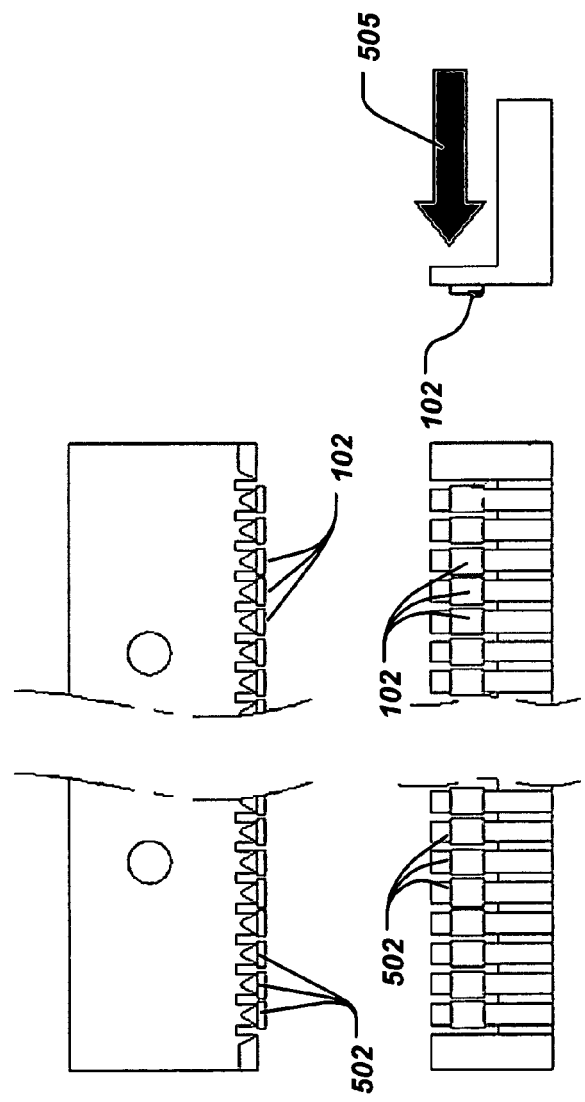

FIG. 5 illustrates an edge blending jig according to an embodiment of the present invention. As illustrated in FIG. 5a, in one embodiment, a slider row bar 501 is bonded to multiple arms 502 of the edge blending jig, whereupon the row bar is separated into individual head sliders 102 by a slider parting tool (not shown). One advantage of this jig design is that imperfections on the edges of the sliders 102 (such as edge jump) can be detected by viewing the sliders from behind 505 and observing the uniformity of gaps between the sliders 102.

Figure 6:
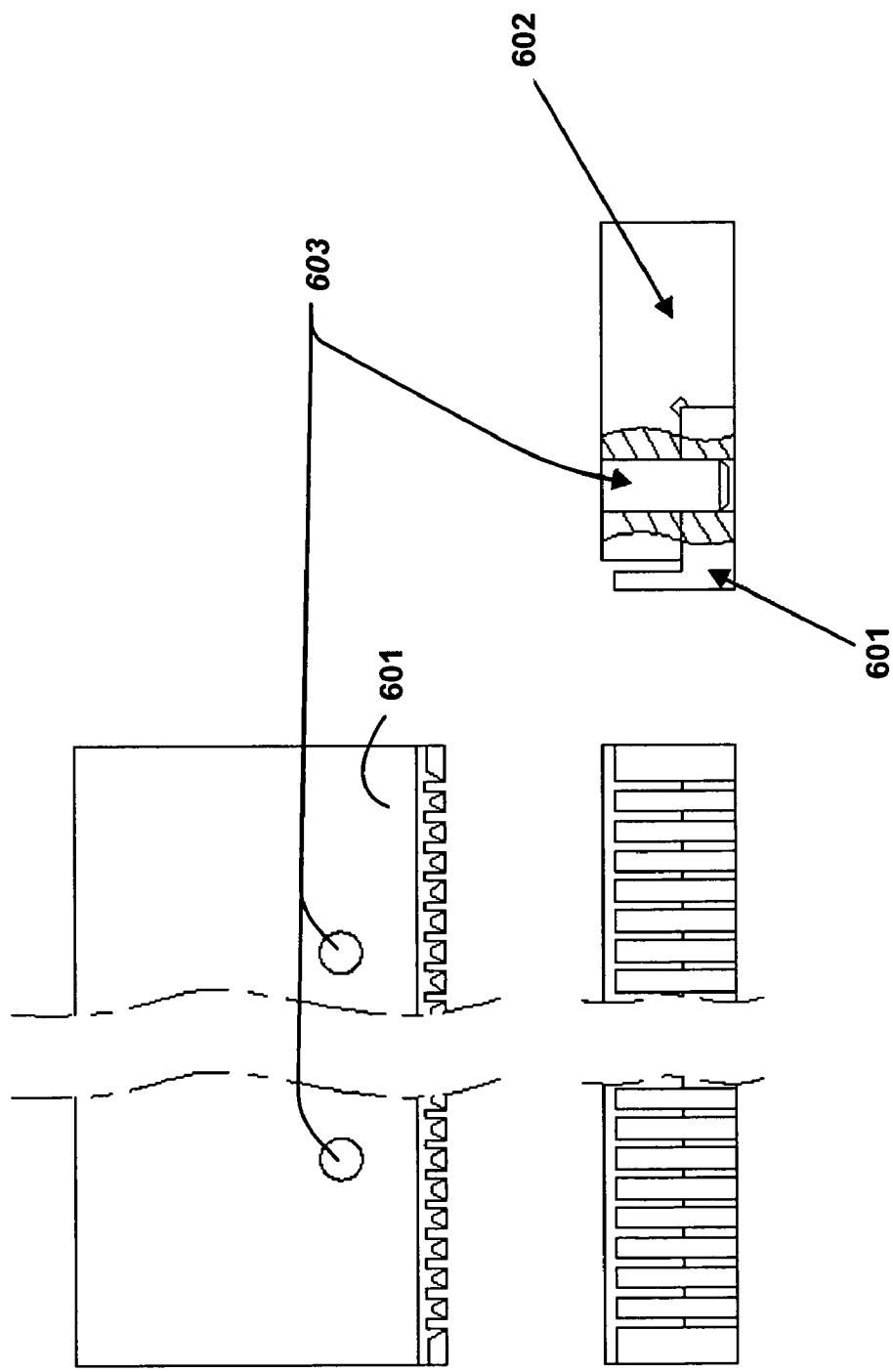
FIG. 6 illustrates the attachment of a head blending jig to a head blending machine according to an embodiment of the present invention.

FIG. 6 illustrates the attachment of a head blending jig 601 to a head blending machine according to an embodiment of the present invention. In one embodiment, the edge blending jig 601 is coupled to a support assembly 602 of the head blending machine by a pair of pins 603.

Figure 7A:
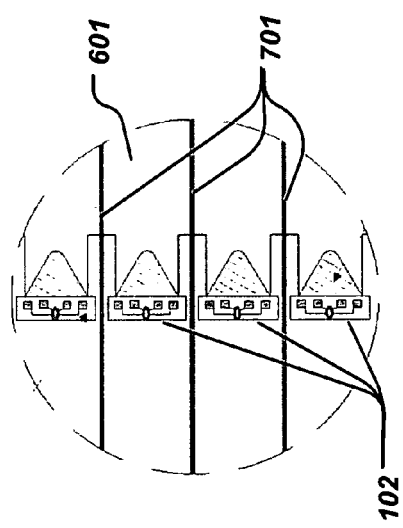
FIG. 7 illustrates portions of lapping tape inserted between individual head sliders mounted to an edge blending jig in a standby configuration and in two edge blending configurations according to an embodiment of the present invention.
Figure 7B:
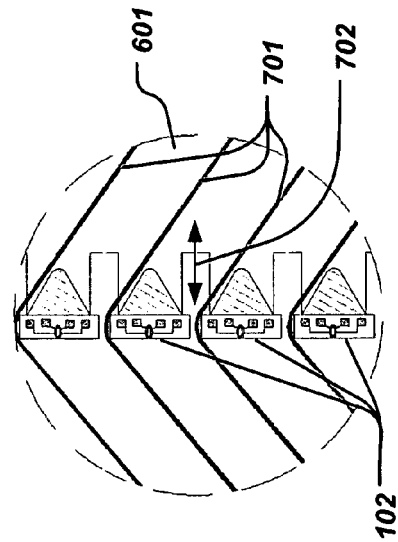
Figure 7C:
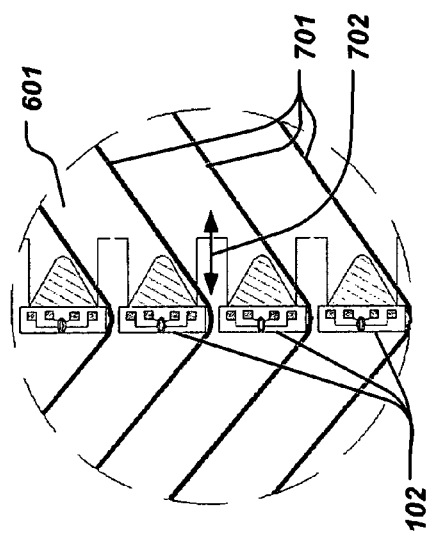

FIG. 7 illustrates portions of lapping tape inserted between individual head sliders mounted to an edge blending jig in a 'standby' configuration and in two edge blending configurations according to an embodiment of the present invention. As illustrated in FIG. 7a, in one embodiment, lapping tape 701 covered with an abrasive, such as diamond powder (e.g., of a grade between 0.1 microns and 3.0 microns), is inserted between sliders 102. FIG. 7a shows the edge blending assembly in a 'standby' configuration with the sliders 102 out of contact with the lapping tape 701. FIG. 7b shows the edge blending assembly configured to partially wrap the lapping tape 701 across one of the edges of each slider 102 on the edge blending jig 601 according to an embodiment of the present invention. In this embodiment, the lapping tape is positioned by an adjustable series of rollers (described below) to be stretched across the slider edges at a predetermined tension force (e.g., less than 0.8 kilograms). In this embodiment, the edge blending jig 601 is directionally oscillated 702 by the edge blending assembly to cause relative motion between the sliders 102 and the lapping tape 701 (e.g., at a frequency of at least 1 cycle per second and at an amplitude between 10 millimeters and 40 millimeters). FIG. 7c shows the edge blending assembly configured to partially wrap the lapping tape 701 across the opposite edge of each slider 102 according to an embodiment of the present invention. In this embodiment, the edge blending assembly is configured to stretch the lapping tape 701 across the opposite edge of each slider to complete the edge blending process. As explained below, in one embodiment, the process of edge blending is performed submerged in lubricant.

Figure 8:
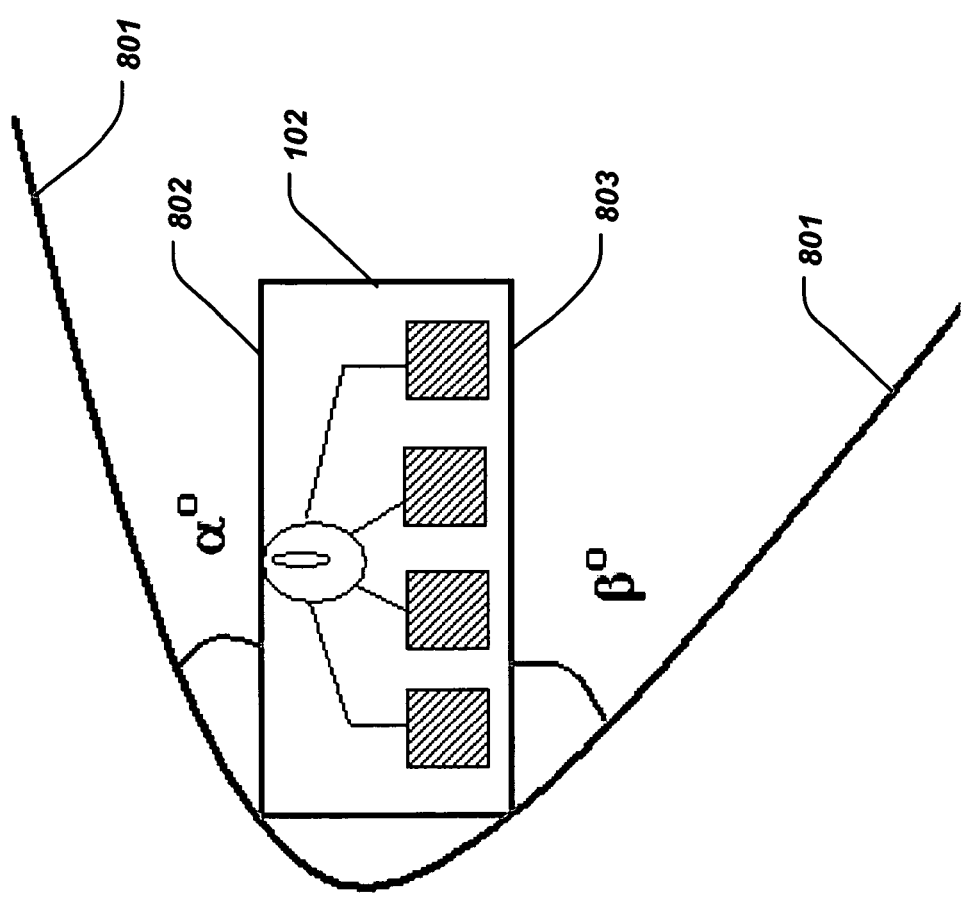
FIG. 8 provides a more detailed illustration of lapping tape partially wrapping a slider's edge to perform edge blending according to an embodiment of the present invention.

FIG. 8 provides a more detailed illustration of lapping tape partially wrapping a slider's edge to perform edge blending according to an embodiment of the present invention. In one embodiment, a first angle ($\alpha$) is formed between a face 802 of the slider 102 and the lapping tape 801, and a second angle ($\beta$) is formed between the opposite face 803 of the slider 102 and the lapping tape 801 ($\alpha$ and $\beta$ being between 102 degrees and 90 degrees, for example).

Figure 9:
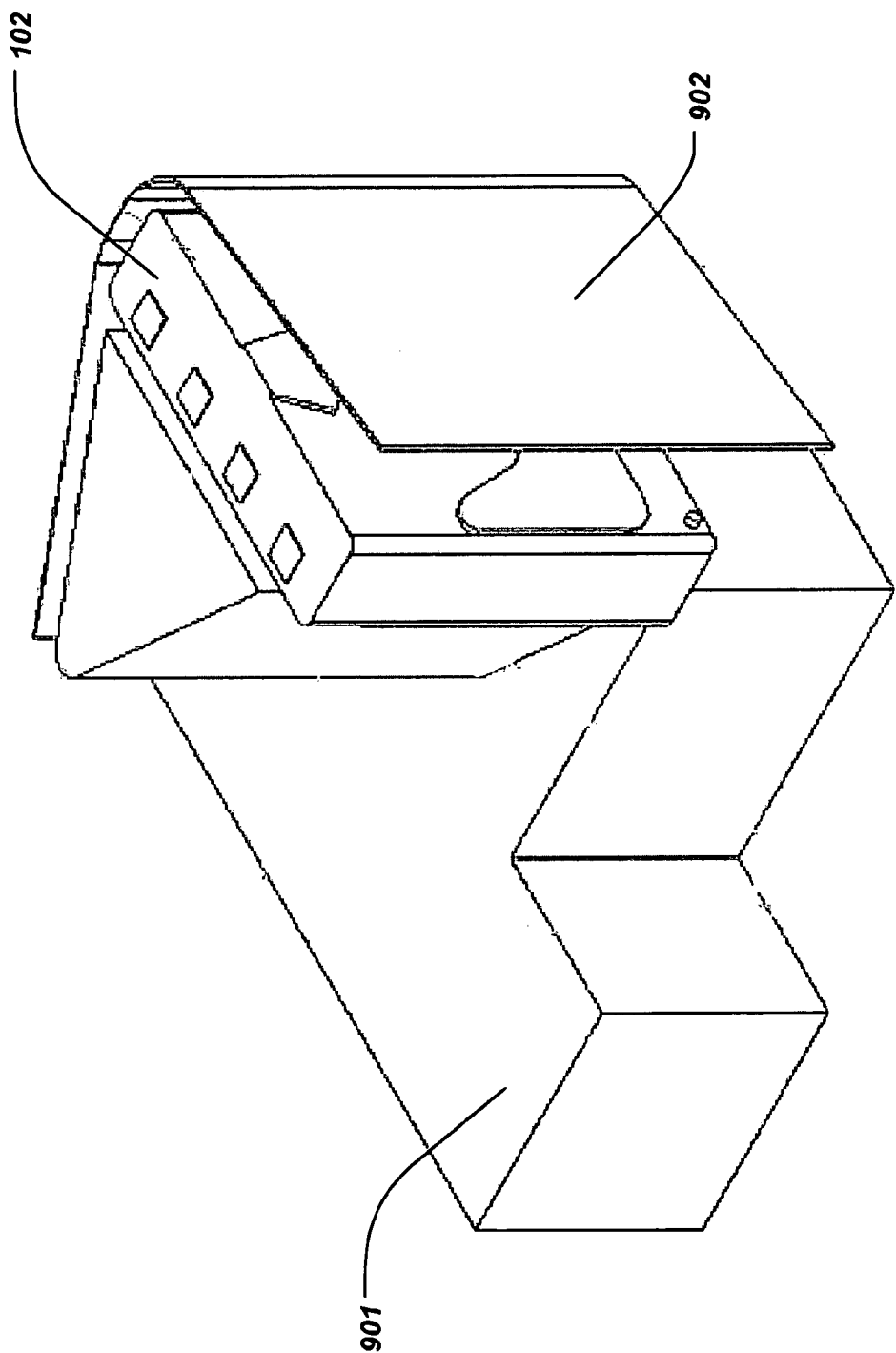
FIG. 9 provides a detailed view of an individual slider mounted to an arm of an edge blending jig with lapping tape partially wrapping a slider edge for edge blending according to an embodiment of the present invention.

FIG. 9 provides a detailed view of an individual slider mounted to an arm of an edge blending jig with lapping tape partially wrapping a slider edge for edge blending according to an embodiment of the present invention. In one embodiment, after a row bar is bonded to multiple arms of an edge blending jig 901 (by, e.g., epoxy) and cut into individual mounted sliders 102 (such as by a diamond cutting wheel), lapping tape 902 is inserted between the sliders 102 and the edge blending assembly is configured to wrap the lapping tape 902 around an edge of the slider 102 under a predetermined amount of tensile force. As stated above, in this embodiment, the slider 102 is directionally oscillated to achieve relative motion between the slider 102 and the lapping tape 902.

Figure 10:
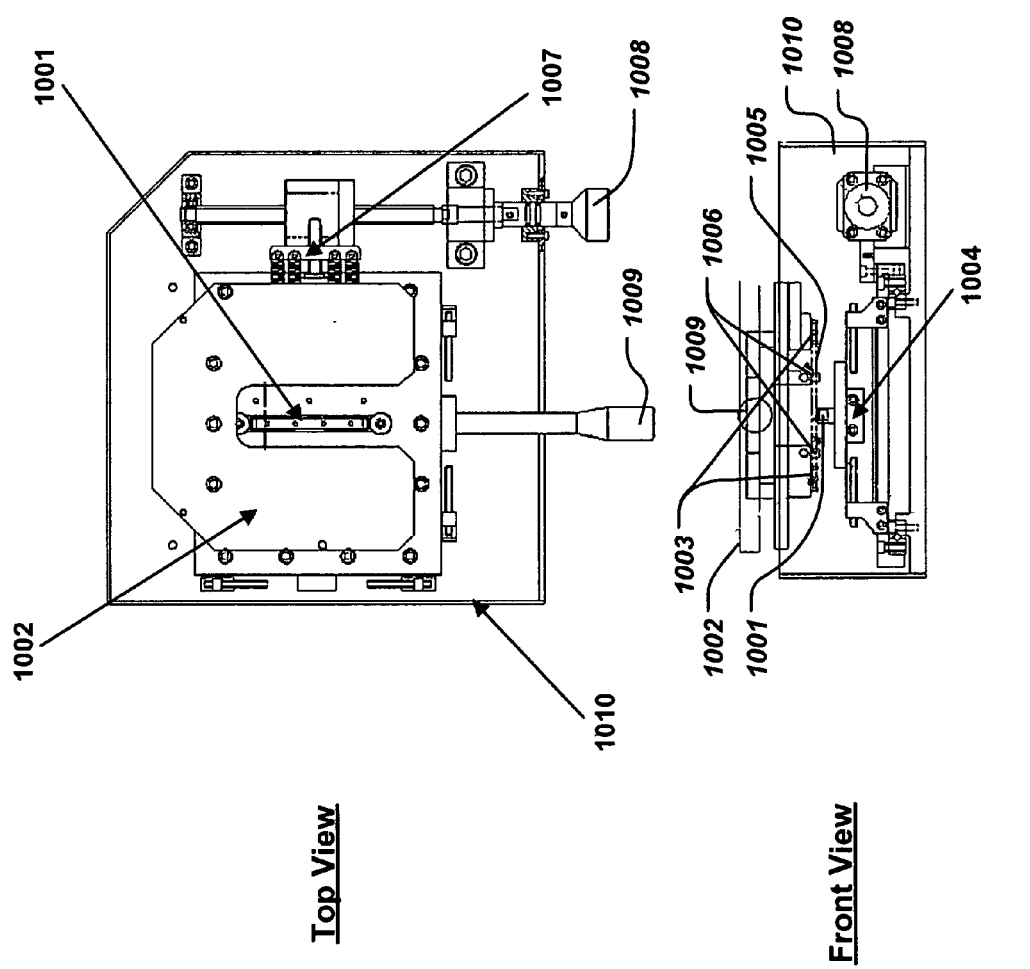
FIG. 10 illustrates an edge blending machine according to an embodiment of the present invention.

FIG. 10 illustrates an edge blending machine according to an embodiment of the present invention. In one embodiment, an edge blending jig with mounted sliders is coupled to a jig support 1001 and mounted in the edge blending machine. In this embodiment, a top platform 1002, containing lapping tape rollers 1003, is attached to a base unit 1004, supporting the edge blending jig. In this embodiment, portions of lap tape 1005 are positioned and kept in alignment by a series of guide arms 1006. In this embodiment a spring mechanism 1007, which is adjusted by a tension adjustment knob 1008, is utilized to maintain the appropriate tensile force for the portions of lapping tape 1005. Maintaining appropriate lapping tape tension is important to prevent lapping tape 1005 breakage or dislodging of sliders from the edge blending jig arms.

In this embodiment, another adjustment knob 1009 is utilized to move the lapping tape portions relative to the sliders (on the edge blending jig) to shift the relative position to partially wrap the slider edges appropriately (to provide the appropriate angles of $\alpha$ and $\beta$. In this embodiment, the process of edge blending is performed with the edge blending assembly submerged in lubricant. In this embodiment, a reservoir 1010 is filled above the level of the sliders with a lubricant (such as a mixture of de-ionized (DI) water and oil) before edge blending.

In one embodiment, rubber tape is used instead of the lapping tape with the reservoir 1010 filled with a diamond slurry. In this embodiment, the diamond particles travel on the rubber tape as an abrasive to smooth the slider edge's surface. Also, in an embodiment, a cleaning process could be performed after edge blending, wherein the lapping tape 1001 is replaced with rubber tape and the reservoir 1010 is filled with a cleaning solution. The slider would be oscillated with respect to the rubber tape in the cleaning solution to clean any debris left on the sliders after the edge blending process.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system for manufacturing a hard disk drive head slider comprising:
    an edge blending jig of an edge blending assembly to bond to a number of head sliders for edge blending, said edge blending by lapping tape, wherein
    said edge blending jig is configured to receive a portion of lapping tape between each of a number of said sliders;
    said edge blending jig is configured to allow said lapping tape to partially wrap a side edge between a front and rear face of each slider; and
    said edge blending is performed by relative movement between said sliders and said lapping tape,
    wherein said edge blending is by directional oscillation of said sliders with respect to said lapping tape.

2. The system of claim 1, wherein said oscillation of the sliders is at a frequency of at least 1 cycle per second.

3. The System of claim 1, wherein said oscillation of the sliders is at an amplitude of at least 10 millimeters.

4. The system of claim 1, wherein said slider oscillation is performed with a first angle ($\alpha$) between a first face of the slider and the lapping tape and with a second angle ($\beta$) between a second face of the slider and the lapping tape, said first angle and said second angle each being between 3 degrees and 90 degrees.

5. The system of claim 1, wherein said slider oscillation is performed with a portion of lapping tape partially wrapped around an edge of each slider under a tension force of at least 0.05 kilograms.

6. The system of claim 1, wherein said edge blending is performed with said sliders and said lapping tape submerged in a lubricant.

7. The system of claim 1, wherein said lapping tape has a lapping surface covered with an inorganic powder.

8. The system of claim 7, wherein said inorganic powder is diamond powder.

9. The system of claim 7, wherein said powder has a grade between 0.1 microns and 3.0 microns.

10. The system of claim 1, wherein said lapping tape has a thickness between 40 microns and 100 microns.

11. The system of claim 1, wherein said lapping tape is greater than 1.2 millimeters in width.

12. The system of claim 1, wherein a slider row bar is to be bonded to said edge blending jig, said row bar to be separated into individual head sliders upon the edge blending jig.

13. The system of claim 12, wherein said row bar is to be separated into individual sliders by a diamond cutting wheel.

14. The system of claim 1, wherein for a slider cleaning process said lapping tape is a rubber tape and said oscillation is performed with said sliders and said rubber tape submerged in a cleaning solution.

15. The system of claim 14, wherein said cleaning process is performed for at least 30 seconds.

16. The system of claim 1, wherein said lapping tape is a rubber tape and said oscillation is performed with said sliders and said rubber tape submerged in a diamond slurry.

17. A method for manufacturing a hard disk drive head slider comprising:
- inserting lapping tape between each of a number of head sliders bonded to a edge blending jig of an edge blending assembly;
- adjusting said edge blending assembly to cause the lapping tape to partially wrap a side edge between a front and rear face of each slider; and
- edge blending said head sliders by relative movement between said sliders and said lapping tape; wherein said edgy blending is by directional oscillation of said sliders with respect to said lapping tape.

18. The method of claim 17, wherein said oscillation of the sliders is at a frequency of at least 1 cycle per second and an amplitude of at least 10 millimeters.

19. The method of claim 17, wherein said slider oscillation is performed with a first angle ($\alpha$) between a first face of the slider and the lapping tape and with a second angle ($\beta$) between a second face of the slider and the lapping tape, said first angle and said second angle each being between 3 degrees and 90 degrees.

20. The method of claim 17, wherein said slider oscillation is performed with a portion of lapping tape partially wrapped around an edge of each slider under a tension force of at least 0.05 kilograms.

21. The method of claim 17, wherein said edge blending is performed with said sliders and said lapping tape submerged in a lubricant.

22. The method of claim 17, wherein said lapping tape has a lapping surface covered with a diamond powder having a grade between 0.1 microns and 3.0 microns.

23. The method of claim 17, wherein said lapping tape has a thickness between 40 microns and 100 microns.

24. The method of claim 17, further comprising:
- bonding a head slider row bar to said edge blending jig; and
- separating said row bar into said number of head sliders.

25. The method of claim 24, wherein said separating said row bar is performed by a slider parting tool.

26. The method of claim 17, wherein for a slider cleaning process said lapping tape is a rubber tape and said oscillation is performed with said sliders and said rubber tape submerged in a cleaning solution.

27. The method of claim 26, wherein said cleaning process is performed for at least 30 seconds.

28. The method of claim 17, wherein said lapping tape is a rubber tape and said oscillation is performed with said sliders and said rubber tape submerged in a diamond slurry.

29. A method for manufacturing a hard disk drive head slider comprising:
- bonding a head slider row bar to a edge blending jig of an edge blending assembly;
- separating upon the edge blending jig the row bar into a number of head sliders;
- inserting lapping tape between each slider on the edge blending jig;
- adjusting said edge blending assembly to cause the lapping tape to partially wrap a side edge between a front and rear face of each slider; and
- edge blending said head sliders by motion oscillation of said sliders with respect to said lapping tape.

* * * * *

UNITED STATES PATENT AND TRADEMARK OFFICE
CERTIFICATE OF CORRECTION

PATENT NO.         : 7,189,150 B2
APPLICATION NO. : 10/691389
DATED               : March 13, 2007
INVENTOR(S)      : Zhu Jian Zhan et al.

Page 1 of 1

It is certified that error appears in the above-identified patent and that said Letters Patent is hereby corrected as shown below:

Title Page, Item (75) Inventors: "(CH)" should be -- (CN) --

Title Page, Item (30) Foreign Application Priority Data: "(CH)" should be -- (CN) --

Column 3, line 16: "102 degrees" should be -- 3 degrees --

Column 3, line 51: "β." should be -- β). --

Column 5, line 10: "tape;" should be -- tape, --

Signed and Sealed this

Twelfth Day of May, 2009

JOHN DOLL
*Acting Director of the United States Patent and Trademark Office*